(12) United States Patent
Sivarajan et al.

(10) Patent No.: US 11,450,446 B2
(45) Date of Patent: Sep. 20, 2022

(54) CARBON NANOTUBE BASED HYBRID FILMS FOR MECHANICAL REINFORCEMENT OF MULTILAYERED, TRANSPARENT-CONDUCTIVE, LAMINAR STACKS

(71) Applicant: Nano-C, Inc., Westwood, MA (US)

(72) Inventors: Ramesh Sivarajan, Shrewsbury, MA (US); Henning Richter, Newton, MA (US); Viktor Vejins, Concord, MA (US)

(73) Assignee: NANO-C, INC., Westwood, MA (US)

( * ) Notice: Subject to any disclaimer, the term of this patent is extended or adjusted under 35 U.S.C. 154(b) by 682 days.

(21) Appl. No.: 15/571,531

(22) PCT Filed: May 5, 2015

(86) PCT No.: PCT/US2015/029288
§ 371 (c)(1),
(2) Date: Nov. 3, 2017

(87) PCT Pub. No.: WO2016/178671
PCT Pub. Date: Nov. 10, 2016

(65) Prior Publication Data
US 2018/0144844 A1 May 24, 2018

(51) Int. Cl.
*B32B 9/00* (2006.01)
*H01B 1/22* (2006.01)
(Continued)

(52) U.S. Cl.
CPC ............... *H01B 1/22* (2013.01); *B32B 5/16* (2013.01); *B32B 5/22* (2013.01); *C01B 32/158* (2017.08);
(Continued)

(58) Field of Classification Search
CPC ............... Y10T 428/30; B82Y 30/00
(Continued)

(56) References Cited

U.S. PATENT DOCUMENTS

| 5,424,054 A | 6/1995 | Bethune et al. |
|---|---|---|
| 5,985,232 A | 11/1999 | Howard et al. |

(Continued)

FOREIGN PATENT DOCUMENTS

| CN | 101656122 A | 2/2010 |
|---|---|---|
| CN | 102017012 A | 4/2011 |

(Continued)

OTHER PUBLICATIONS

European Extended Search Report issued in European Patent Application No. EP15891358.2, dated Jan. 25, 2019 (9 pages).

(Continued)

*Primary Examiner* — Daniel H Miller
(74) *Attorney, Agent, or Firm* — Wilmer Cutler Pickering Hale and Dorr LLP

(57) ABSTRACT

A multi-layered, transparent-conductive stack with improved mechanical robustness, and a method of making the same, is described. The multi-layered film includes a layer of a hybrid film and a layer of a transparent conductive oxide (TCO) coating that is sputter deposited and forms a contact with the hybrid film. The hybrid film includes an interconnected network of carbon nanotubes (CNTs) and a plurality of metal oxide nanoparticles (MONs). The plurality of MONs are randomly distributed in the interconnected network of CNTs forming an electrical contact with the CNTs.

15 Claims, 11 Drawing Sheets

(51) Int. Cl.
*B32B 5/16* (2006.01)
*B32B 5/22* (2006.01)
*H01B 1/02* (2006.01)
*G09F 9/00* (2006.01)
*C08K 3/22* (2006.01)
*C09D 1/00* (2006.01)
*C01B 32/158* (2017.01)
*C08K 3/04* (2006.01)
*B82Y 30/00* (2011.01)

(52) U.S. Cl.
CPC ............... *C08K 3/22* (2013.01); *C09D 1/00* (2013.01); *G09F 9/00* (2013.01); *H01B 1/02* (2013.01); *B32B 2313/04* (2013.01); *B82Y 30/00* (2013.01); *C08K 3/041* (2017.05); *C08K 2003/2231* (2013.01); *C08K 2201/011* (2013.01); *C08K 2201/016* (2013.01); *Y10T 428/30* (2015.01)

(58) Field of Classification Search
USPC .......................................................... 428/408
See application file for complete search history.

(56) References Cited

U.S. PATENT DOCUMENTS

| | | | |
|---|---|---|---|
| 6,221,330 | B1 | 4/2001 | Moy et al. |
| 7,045,087 | B2 | 5/2006 | Kotov |
| 7,887,775 | B2 | 2/2011 | Height et al. |
| 9,214,256 | B2 | 12/2015 | Sivarajan et al. |
| 2003/0122111 | A1* | 7/2003 | Glatkowski ............ B82Y 30/00 252/500 |
| 2007/0246689 | A1 | 10/2007 | Ge et al. |
| 2007/0298253 | A1* | 12/2007 | Hata ...................... B82Y 30/00 428/339 |
| 2008/0259262 | A1 | 10/2008 | Jones et al. |
| 2010/0045610 | A1 | 2/2010 | Hong et al. |
| 2010/0047522 | A1 | 2/2010 | Sivarajan et al. |
| 2010/0089636 | A1 | 4/2010 | Ramadas et al. |
| 2010/0098902 | A1 | 4/2010 | Kotov et al. |
| 2011/0048277 | A1 | 3/2011 | Sivarajan et al. |
| 2014/0290987 | A1 | 10/2014 | Yang et al. |

FOREIGN PATENT DOCUMENTS

| | | |
|---|---|---|
| JP | 2010-50078 A | 3/2010 |
| JP | 2010-525526 A | 7/2010 |
| JP | 2011-517501 A | 6/2011 |
| WO | WO-200276724 A1 | 10/2002 |
| WO | WO-2008131304 A1 | 10/2008 |
| WO | WO-2009154830 A2 | 12/2009 |
| WO | WO-2010021433 A1 | 2/2010 |

OTHER PUBLICATIONS

Castro, M.R.S. et al., "Transparent conducting antimony-doped tin oxide films containing functionalized multi-walled carbon nanotubes", phys. stat. sol., (a), 204(10):3380-3386, published online Aug. 7, 2007 (7 pages).

Guo, T. et al., "Catalytic growth of single-walled nanotubes by laser vaporization", Chemical Physics Letters, 243:49-54, Sep. 8, 1995 (6 pages).

International Search Report and Written Opinion issued in International Application No. PCT/US15/29288, issued by U.S. Patent and Trademark Office as International Searching Authority, dated Jul. 16, 2015 (10 pages).

Thess, A. et al., "Crystalline Ropes of Metallic Carbon Nanotubes", Science, 273:483-487, Jul. 26, 1996 (5 pages).

Chen, Z. et al., "Fabrication of Highly Transparent and Conductive Indium-Tin Oxide Thin Films with a High Figure of Merit via Solution Processing", Langmuir, 29:13836-13842, 2013 (7 pages).

* cited by examiner

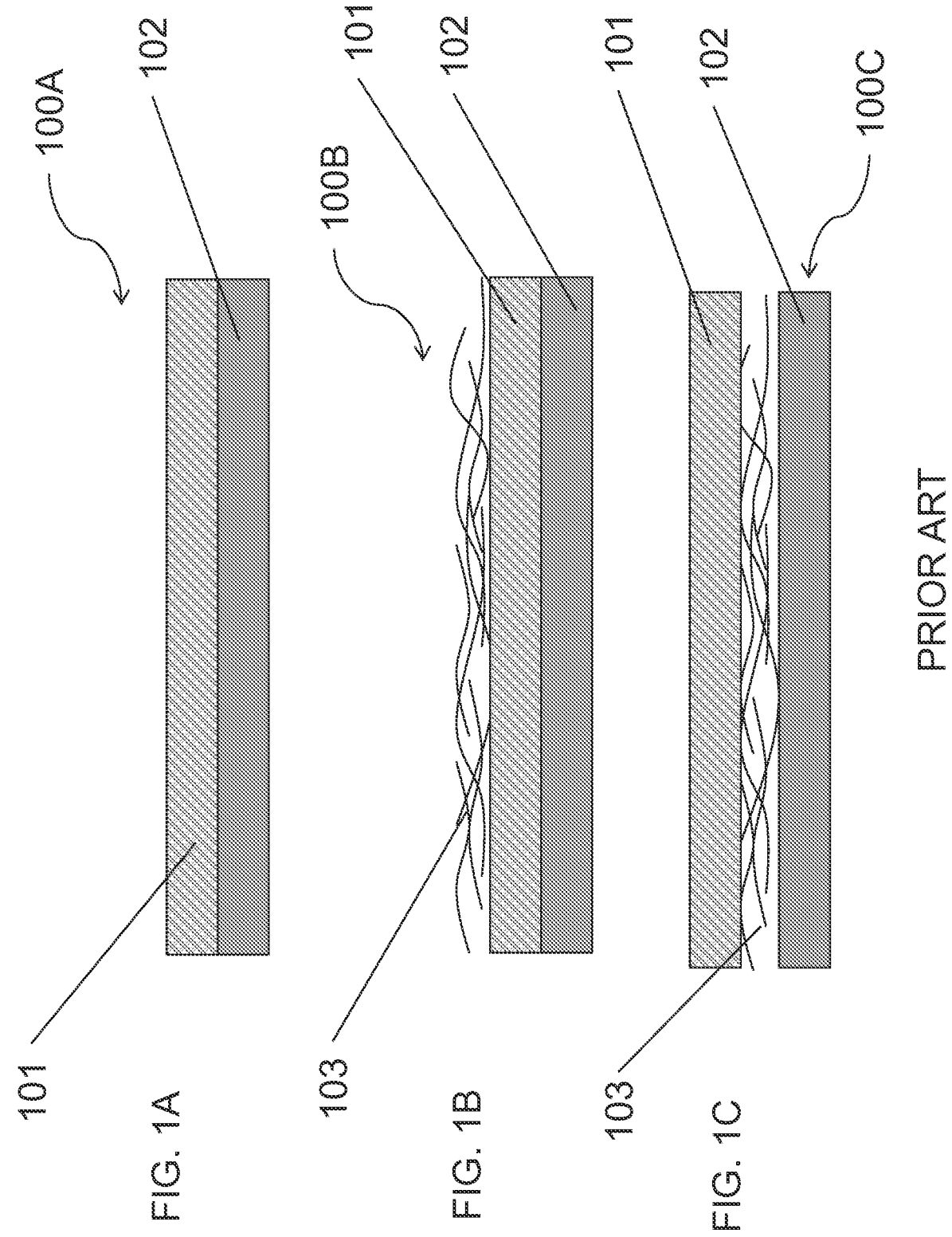

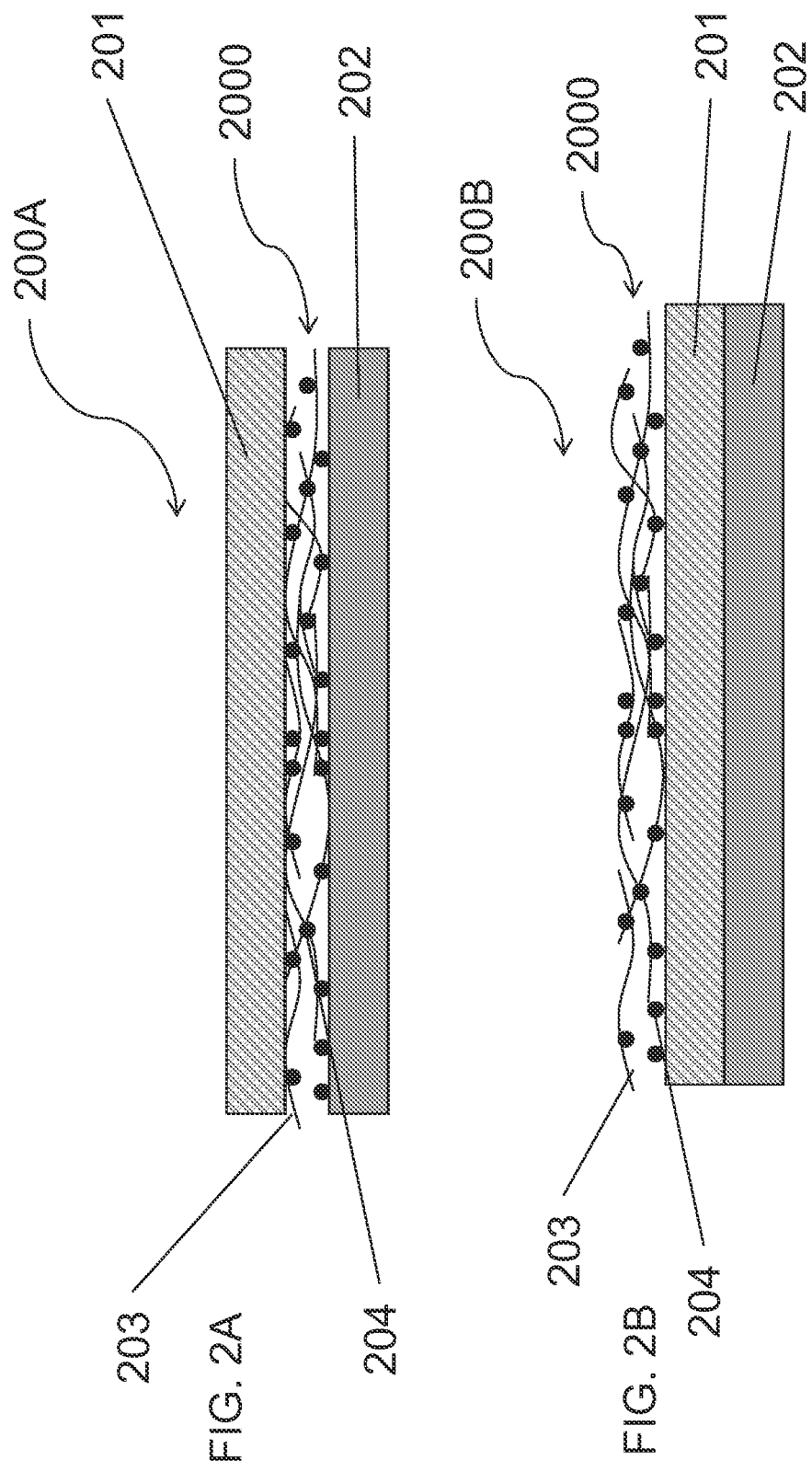

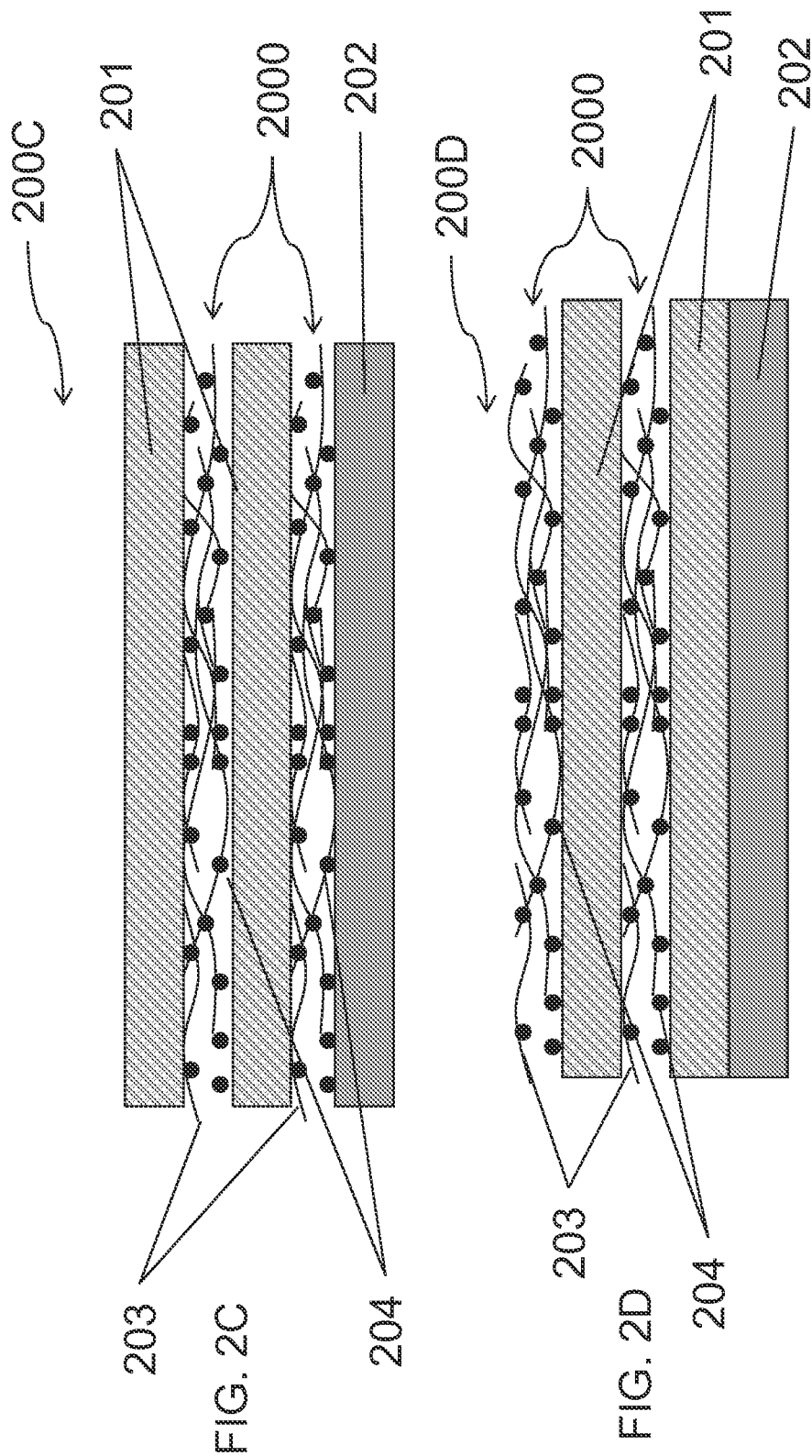

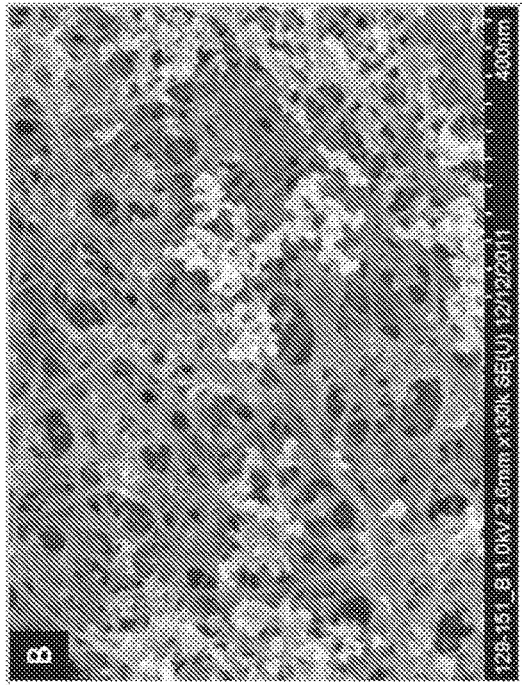
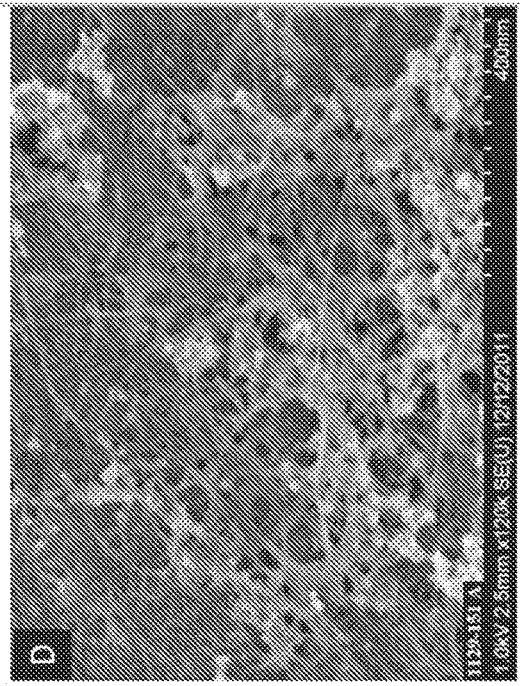
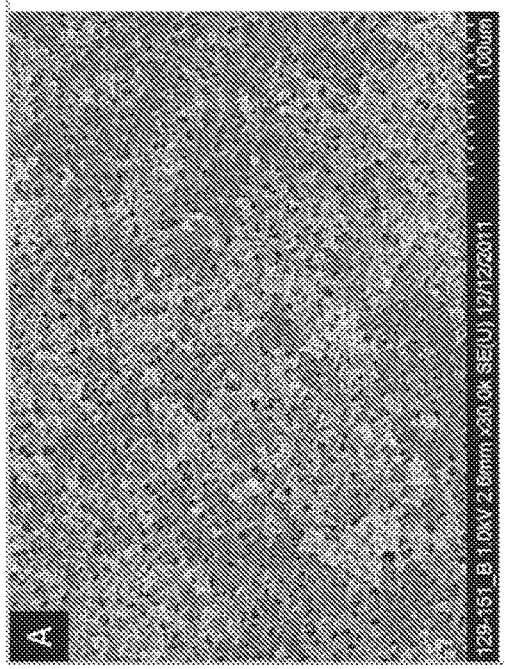
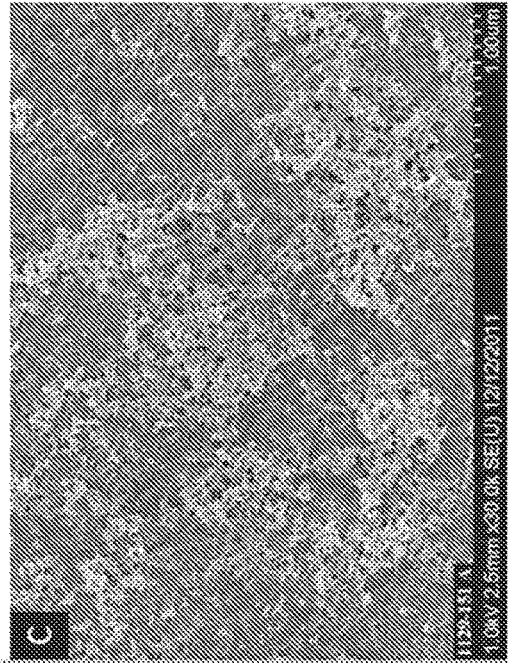
FIG. 5

CARBON NANOTUBE BASED HYBRID FILMS FOR MECHANICAL REINFORCEMENT OF MULTILAYERED, TRANSPARENT-CONDUCTIVE, LAMINAR STACKS

This application is a U.S. National Stage application under 35 U.S.C. § 371 of International Patent Application No. PCT/US2015/029288, filed May 5, 2015.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

This application is related to U.S. patent application Ser. No. 12/404,829 filed on Mar. 16, 2009 the contents of which are hereby incorporated by reference in its entirety.

FIELD OF INVENTION

The disclosed subject matter is in the field of transparent conductive coatings for display and touch screen applications. In particular, the disclosed subject matter relates to the improvement of mechanical properties of ceramic oxide based transparent conductive oxides like sputtered indium tin oxide (ITO) coatings on flexible substrates such as polyester films (e.g., polyethylene terephthalate "PET").

SUMMARY

In an aspect, a multi-layered film including a substrate; a layer of a hybrid film including a three dimensionally interconnected network of carbon nanotubes (CNTs) and a plurality of metal oxide nanoparticles (MONs); wherein, the plurality of metal oxide nanoparticles are randomly distributed in the interconnected network; and a layer of a transparent conductive oxide (TCO) coating; wherein, the transparent conductive oxide is sputter deposited to form a distinct layer in contact with the hybrid film.

In some embodiments, the transparent conductive oxide (TCO) coating is disposed on the substrate and the transparent conductive oxide (TCO) coating is disposed between the hybrid film and the substrate. In some other embodiments, the transparent conductive oxide (TCO) coating is disposed on the hybrid film and the hybrid film is disposed between the TCO coating and the substrate.

In some embodiments, the substrate is selected from a group consisting of metals, silicon, silicon oxide, plastics, organic polymers, inorganic polymers, glasses, crystals, and composite materials. In some embodiments, the substrate is transparent.

In some embodiments, the metal oxide nanoparticles (MONs) are indium tin oxide (ITO). In some other embodiments, the metal oxide nanoparticles (MONs) are selected from a group consisting of $ZnO$, $SnO_2$, $ZnSnO_3$, $Cd_2SnO_4$, $In_2O_3$: $Sn$, $ZnO:F$, $Cd_2SnO_4$, $ZnO:Al$, $SnO_2:F$, $ZnO:Ga$, $ZnO:B$, $SnO_2:Sb$, $ZnO:In$ and mixtures thereof.

In some embodiments, the transparent conductive oxide (TCO) coating is sputtered indium tin oxide. In some other embodiments, the transparent conductive oxide (TCO) coating is made of a material selected from a group consisting of $ZnO$, $SnO_2$, $ZnSnO_3$, $Cd_2SnO_4$, $In_2O_3$: $Sn$, $ZnO:F$, $Cd_2SnO_4$, $ZnO:Al$, $SnO_2:F$, $ZnO:Ga$, $ZnO:B$, $SnO_2:Sb$, $ZnO:In$ and mixtures thereof.

In some embodiments, the carbon nanotubes (CNTs) are chemically derivatized (functionalized).

In some embodiments, the metal oxide nanoparticles are functionalized with a surface chemical species. In some embodiments, a moiety of the surface chemical species used to functionalize the metal oxide nanoparticle is selected from a group consisting of —OH, —COOH, —$NH_2$, ether, ester, amide, —Cl, and —Br.

In some embodiments, the carbon nanotubes (CNTs) are long nanotubes with lengths longer than 1, 2, 3, 4, or 5 microns. In some other embodiments, the carbon nanotubes (CNTs) are single walled carbon nanotubes (SWCNTs).

In some embodiments, the metal oxide nanoparticles (MON) has a mean particle size in the range of 1 nm to about 500 nm.

In some embodiments, the surface coverage of the hybrid film is greater than 10%.

In some embodiments, the ratio of the amount of CNT:MON ranges from about 1:99 to 99:1. In some other embodiments, the ratio of the amount of CNT:MON is about 50:50.

In some embodiments, the optical transparency of the multi-layered film is greater than about 70%.

In some embodiments, the electrical conductance of the multi-layered film is less than 2000 ohms/square.

In some embodiments, the optical transparency of the multi-layered film is between 75-95% and the surface resistance of the hybrid film is about 10-2000 ohms/square.

In some embodiments, the metal oxide nanoparticles (MONs) are spherical, oblong, prismatic, ellipsoidal, rods, and irregularly shaped.

In some embodiments, the thickness of the hybrid film ranges from about 2 nm to about 100 nm.

In some embodiments, the metal oxide nanoparticles (MONs) have an aspect ratio of about 1 to about 5.

In some embodiments, the layer of the hybrid film and the layer of the transparent conductive oxide (TCO) coating form a repeat unit and the repeat unit is repeatedly stacked over one another to form a multi-stacked structure. In certain embodiments, the multi-stacked structure has at least 2 repeat units.

In an aspect, a method of forming a multi-layered film includes, providing a substrate; providing a first suspension of carbon nanotubes (CNTs) in a first solvent; providing a second suspension of metal oxide nanoparticles (MONs) in a second solvent; applying, in any order, the carbon nanotubes to the substrate from the first solvent and the metal oxide nanoparticles (MONs) from the second solvent, wherein, a plurality of the metal oxide nanoparticles are distributed throughout the carbon nanotubes to form an interconnected network; repeating said applying of the carbon nanotubes from the first solvent and said applying the metal oxide nanoparticles (MONs) from the second solvent to form a hybrid film; and before or after formation of the hybrid film, applying a distinct layer of a transparent conductive oxide (TCO) coating over the substrate.

In some embodiments, the layer of the hybrid film and the layer of the transparent conductive oxide (TCO) coating form a repeat unit and the repeat unit is repeatedly stacked over one another to form a multi-stacked structure. In certain embodiments the multi-stacked structure has at least 2 repeat units.

In some embodiments, the application of the first solvent is done by a process selected from a group consisting of spraying, reel to reel coating, dip coating, spin coating and roll coating.

In some embodiments, the carbon nanotubes (CNTs) in the first solvent carry an opposite charge to that of the charge carried by the metal oxide nanoparticles (MONs) in the second solvent. In some other embodiments, the method further includes providing a binder between providing and applying the first suspension of carbon nanotubes (CNTs) and the second suspension of metal oxide nanoparticles (MONs), wherein, the carbon nanotubes (CNTs) in the first solvent and the metal oxide nanoparticles (MONs) in the second solvent carry a same charge and the binder carries an opposite charge relative to the charge carried by the carbon nanotubes and the metal oxide nanoparticles (MONs).

BRIEF DESCRIPTION OF DRAWINGS

The above and other objects and advantages of the present invention will be apparent upon consideration of the following detailed description, taken in conjunction with the accompanying drawings in which the reference characters refer to like parts throughout, and in which:

FIG. 1A is a schematic representation of an embodiment according to the prior art where a sputtered ITO film is deposited on a substrate;

FIG. 1B is a schematic representation of an embodiment according to the prior art where an additional CNT film is deposited as a coating on the structure shown in FIG. 1A;

FIG. 1C is a schematic of an embodiment according to the prior art where the CNT film is coated directly on the substrate and a sputtered ITO film is deposited on top of the CNT film;

FIG. 2A shows a schematic structure with a substrate coated with a hybrid film which includes CNTs and MONs followed by a sputtered TCO coating deposited on top of the hybrid film;

FIG. 2B shows a schematic of an alternate structure where the sputtered TCO coating is deposited directly on top of the substrate and the hybrid film, including CNTs and MONs, is deposited on top of the sputtered TCO coating;

FIG. 2C shows a schematic of a structure resulting from repeating the depositions of a repeat unit twice where the repeat unit is formed with depositing the hybrid film, which includes CNTs and MONs, followed by a sputtered TCO coating deposited on top of the hybrid film;

FIG. 2D shows a schematic of a structure resulting from repeating the depositions of a repeat unit twice where the repeat unit is formed with sputtered TCO coating deposition followed by the deposition of the hybrid film, which includes CNTs and MONs, on top of the sputtered TCO coating;

FIG. 5 shows the scanning electron micrographs at various magnifications of typical CNT-ITO hybrid film formed on glass;

DETAILED DESCRIPTION

Figure 3:
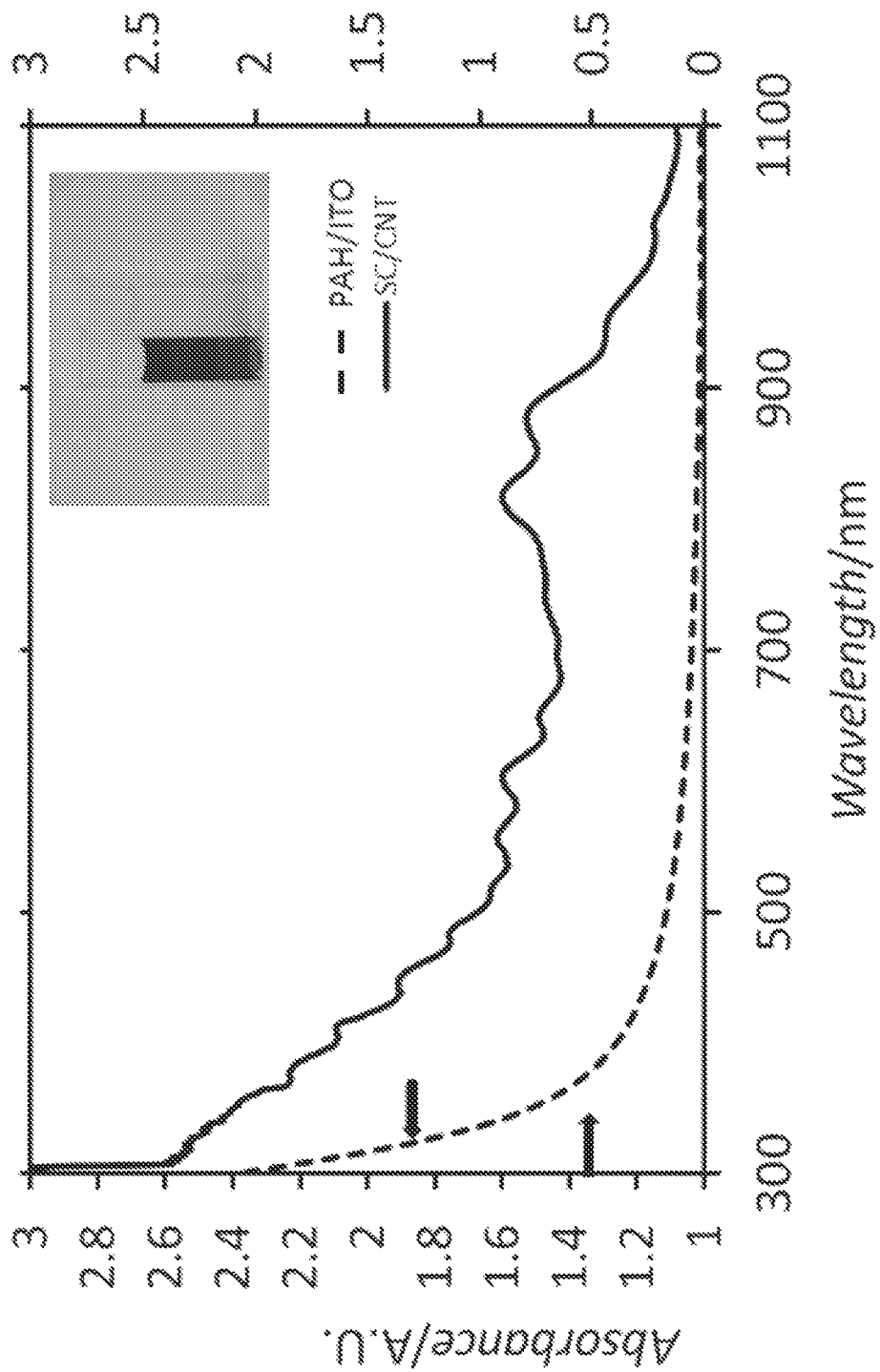
FIG. 3 shows UV-Vis-NIR absorption spectra of surfactant aided dispersion of SWCNT in water (solid line) and ITO nanoparticles suspended in water aided by poly-allylamine hydrochloride (PAH) coating (dotted line). Inset shows the photographs of the dispersions that were used for the work described in some examples. Dark liquid is CNT dispersion and the transparent dispersion is that of ITO nanoparticles.

Sputtered ITO films and other commercially available transparent conductive coatings are excellent candidates for use in applications such as large area displays, conformal displays and coatings on surfaces that need to be thermoformed under increased temperature and mechanical stress. However, the major technical hurdle in the implementation of these films in these applications is their inability to meet the requirements of excellent mechanical properties and environmental stability to factors like humidity and temperature variations. Similarly, transparent conductive coatings and films, besides ITO, that face similar limitations are metal nanowire films, metal mesh structures and conductive polymer films among others.

Transparent-conductive films based on carbon nanotubes have gained prominence over the past decade mainly for their excellent mechanical properties, suitable for flexible applications. Another major advantage of carbon nanotubes is their electrical conductance, even in the form of a few nanometers thick film, coupled with their extreme mechanical flexibility. Since robust CNT films can be made with extremely small thicknesses, such as, CNT monolayer, the resulting films can be transparent and electrically conductive due to a percolated network of carbon nanotubes. However, dense CNT networks cannot be made except with loss in the optical transparencies because CNT are intrinsically light absorbing in visible and UV regions.

Several conventional optically transparent and electrically conductive films are shown in FIG. 1A, FIG. 1B and FIG. 1C. FIG. 1A is a schematic representation of a sputtered ITO film 101 is deposited on a substrate 102. FIG. 1B is a schematic representation of a CNT film 103 deposited as a coating on the structure shown in FIG. 1A. FIG. 1C is a schematic of a CNT film 103 coated directly on the substrate 102 and a sputtered ITO film 101 deposited on top of the CNT film 103.

Laminates of various transparent conductive oxide layers with carbon nanotubes layers have also been proposed. However, such structure nevertheless suffers from the respective problems associated with the single carbon nanotube (e.g., poor optical transparencies) and single transparent conductive oxide films (e.g., poor mechanical strengths) noted above.

Carbon nanotube-based (CNT-based) hybrid films for mechanical reinforcement of multilayered, transparent-conductive, laminar stacks is described. The multi-layered films overcome the problems associated with conventional structures, such as reduction in electrical conductivity, optical transparency, and mechanical properties with prolonged use. Additionally, these multi-layered films offer improved resistance to degradation from environmental factors, such as, exposure to humidity and moisture.

In an aspect, a multi-layered film includes a layer of a hybrid film and a layer of a transparent conductive oxide (TCO) coating that is sputter deposited to be in contact with the hybrid film. The hybrid film includes an interconnected network of carbon nanotubes (CNTs) and a plurality of metal oxide nanoparticles (MONs). The plurality of MONs are randomly distributed in the interconnected network of CNTs forming an electrical contact with the CNTs.

FIG. 2A and FIG. 2B show two embodiments of a structure according to this disclosure. FIG. 2A shows a structure 200A with a substrate 202 coated with a hybrid film 2000. The hybrid film 2000 includes CNTs 203 and MONs 204. A sputtered TCO coating 201 is deposited on top of the hybrid film 2000. FIG. 2B shows an alternate structure 200B where the sputtered TCO coating 201 deposited directly on top of the substrate 202 The hybrid film 2000 is deposited on top of the sputtered TCO coating 201 and includes the CNTs 203 and MONs 204.

In some embodiments, the structure formed by deposition of the sputtered TCO coating 201 and the hybrid film 2000 forms a repeat unit. FIG. 2C shows a schematic of a structure resulting from repeating the depositions of a repeat unit twice where the repeat unit is formed with depositing the hybrid film 2000, which includes CNTs 204 and MONs 203, followed by a sputtered TCO coating 201 deposited on top of the hybrid film. In certain embodiments, the deposition of the repeat unit is repeated more than two times to add additional layers in the multi-layered film.

Similarly, FIG. 2D shows a schematic of a structure resulting from repeating the depositions of a repeat unit twice where the repeat unit is formed with sputtered TCO coating 201 deposition followed by the deposition of the hybrid film 2000, which includes CNTs 204 and MONs 203, on top of the sputtered TCO coating 201. In certain embodiments, the deposition of the repeat unit is repeated more than two times to add additional layers in the multi-layered film.

In some applications, the structures similar to 200A and 200C where the sputtered TCO coating 201 is the last step of deposition, may be utilized. Such configuration may avoid contamination of this layer in subsequent processing steps. In other applications, the structure similar to 200B and 200D may be utilized.

Substrate

In some embodiments, the substrate 202 can be any conductive or non-conductive material, for example, metals, silicon, silicon oxide, plastics, organic polymers, inorganic polymers, glasses, crystals, composite material, etc. The substrate for example, maybe, transparent, semi-transparent, translucent, or opaque. In some embodiments, the substrate may additionally include adhesion promotion coatings or optical coatings like anti-reflectance or index matching coatings.

TCO Coating

In certain embodiments, sputtered TCO coating 201 may be prepared from $In_2O_3$:Sn, ZnO:F, $Cd_2SnO_4$, ZnO:Al, $SnO_2$:F, ZnO:Ga, ZnO:B, $SnO_2$:Sb, ZnO:In, and the like. In an exemplary embodiment, the sputtered TCO coating 201 is sputtered indium tin oxide (ITO) In certain embodiments, the TCO coating 201 may not form a continuous film across the upper portion of the hybrid layer, but serve only to fill in certain regions that appear similar to voids to smoothen out the any surface roughness that may be present on the hybrid film. In certain embodiments, the mean thickness of the TCO coating 201 deposited on the upper portion of the hybrid film 2000 may be of a sufficient thickness so that the mechanical strength (brittleness) is at an acceptable range (e.g., 1-2 nm thick).

Metal Oxide Nanoparticles (MONs)

Suitable material to be used MONs 204 are those having sufficient electrical conductivity event at nanoscale dimensions and optical transparency. By way of example, suitable MONs include ITO, ZnO, $Cd_2SnO_4$, $ZnSnO_3$, among others. Exemplary MONs are listed below in Table 1. Mixtures of different MONs may be used. In particular, the MONs can be ITO nanoparticles.

TABLE 1

Metal oxides and their electrical and optical properties.

| Material | Sheet Resistance (Ω/□) | Visible Absorption Coefficient |
|---|---|---|
| $In_2O_3$:Sn | 6 | 0.04 |
| ZnO:F | 5 | 0.03 |
| $Cd_2SnO_4$ | 7.2 | 0.02 |
| ZnO:Al | 3.8 | 0.05 |
| $SnO_2$:F | 8 | 0.04 |
| ZnO:Ga | 3 | 0.12 |
| ZnO:B | 8 | 0.06 |
| $SnO_2$:Sb | 20 | 0.12 |
| ZnO:In | 20 | 0.20 |

Source: R. G. Gordon, MRS Bulletin, August 2000.

In some other embodiments, the MONs 204 can have any desirable shapes, such as spherical, oblong, prismatic, ellipsoidal, irregular objects, or in the form of nanorods. In the form of a nanorod the diameter of the rods can range from a few nanometers to several tens of nanometers. Their aspect ratio can be as low as 5 to few thousand.

In certain embodiments, certain MONs 204 having an aspect ratio that is larger than 1 can lower the percolative conduction threshold for interconnection of the MONs through a carbon nanotube network, thus improving optical transparency further.

In some embodiments, MONs 204 are formed in the form of oxide sols by the hydrolysis of the corresponding metal-organic precursors. The mean diameter, size dispersity, and aspect ratios of the MONs 204 can be controlled by various factors like concentrations, temperature and duration of the reaction.

In some embodiments the MONs 204 are located throughout the layer and may be in contact with one or more CNTs 203. In some embodiments, the mean particle size distribution of MONs 204 can be as low as a nanometer to several ten nanometers in size and up to few hundred nanometers dependent on the thickness of the sputter coated top oxide. For example, a CNT-tin oxide nanoparticle hybrid layer sputter-coated with a transparent conductive ITO layer is expected work to as well as when using a CNT-ITO hybrid layer. The size of the MONs can be selected to be commensurate with the thickness of the hybrid layer 2000. For example, the MONs can have a particle size of up to about 20 nm, such as about 2-5 nm. In certain embodiments, MONs 204 diameters can range from few ten nanometers to few microns. In other embodiments, the MONs can be monodisperse in size.

In certain embodiments, the interactions between CNTs 203 and MONs 204 can be tailored to exhibit certain attractive interactions with each other through van der Waals interactions, covalent interactions, electrostatic interactions, ionic interactions, and/or any other suitable interactions. For example, the CNTs 203 and MONs 204 can be derivatized to carry electrical charges of specific polarity (e.g., positive or negative charges). For example, silylation of the surface of the MONs 204 with aminopropyl trimethoxy silane can form an amine terminated surface that is negatively charged. In contrast, derivatizing the MONs 204 with alkyl bromide terminal groups can render them positively charged.

In some other embodiments, MONs 204 can be functionalized with a significant concentration of surface chemical species like hydroxyl groups that can then be used for the organic derivatization of the MONs 204. The MONs 204 can be modified further to impart other chemical functionalities, as would be readily apparently to one of ordinary skill in the art. Some non-limiting examples of chemical functionalities that may appear natively, or those that can be prepared on surfaces of the MONs 204 include —OH, —COOH, —NH2, ether, ester, amide, —Cl, —Br, and the like functional groups. In some other embodiments, the surface chemistry of the MONs 204 can be tailored to tether to the surface of the single walled carbon nanotubes through a covalent bonding.

In some embodiments, the hybrid film 2000 can have tunable infra-red properties. CNT-MON hybrid films exhibit good visible light transmittance for many applications, whereas infrared reflectance is poor for CNT films and excellent for TCO films. Hence, CNT-MON hybrid films can be tuned for applications ranging from heat mirrors in buildings to optical modulators.

Carbon Nanotubes (CNTs)

In one or more embodiments, the CNTs 203 comprise single walled carbon-based SWNT-containing material. SWNTs can be formed by a number of techniques, such as laser ablation of a carbon target, combustion of hydrocarbon fuels, decomposing a hydrocarbon, and setting up an arc between two graphite electrodes. For example, U.S. Pat. No. 5,985,232 awarded to Howard et al., describes a method for the production of nanotubes, in which hydrocarbon fuel and oxygen are combusted in a burner chamber at a sub-atmospheric pressure, thereby establishing a flame. In the U.S. Pat. No. 7,887,775, awarded to Height et al., the targeted synthesis of SWCNT in a non-sooting premixed hydrocarbon flame in presence of an unsupported catalyst is described. For example, U.S. Pat. No. 5,424,054, awarded to Bethune et al. describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are coplated, for instance laser heating, electron beam heating and RF induction heating. Smalley (Guo, T., Nikoleev, P., Thess, A., Colbert, D. T., and Smally, R. E., Chem. Phys. Lett. 243: 1-12 (1995)) describes a method of producing single-walled carbon nanotubes wherein graphite rods and a transition metal are simultaneously vaporized by a high-temperature laser. Smalley (Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996)) also describes a process for production of single-walled carbon nanotubes in which a graphite rod containing a small amount of transition metal is laser vaporized in an oven at about 1200° C. Single-wall nanotubes were reported to be produced in yields of more than 70%. U.S. Pat. No. 6,221,330, which is incorporated herein by reference in its entirety, discloses methods of producing single-walled carbon nanotubes which employs gaseous carbon feedstocks and unsupported catalysts.

In certain embodiments, the CNTs 204 network can be formed using long nanotubes, such as nanotubes having a length longer than 1, 2, 3, 4, or 5 microns. In other embodiments, the CNTs 204 network can be formed using predominantly metallic nanotubes or predominantly semi-conducting nanotubes, or a mixture thereof. In some other embodiments, the nanotubes can be selected so that the work function (i.e., the minimum energy required to remove an electron from the surface of a particular material) of the nanotubes are matched with the work function of the MONs.

CNTs 204 may also be obtained in the form of a dispersion to provide a CNT ink. Examples of such CNT dispersions are commercially available from Brewer Science, Rolla, Mo. and Carbon Solutions, Inc., Riverside, Calif. among others. Alternately the CNT dispersions can be tailor made by prior art methods or proprietary custom methods starting from raw carbon nanotubes. Similarly MONs can be obtained from a variety of commercial sources in the form of stably dispersed sols.

In some embodiments, the electronic structure of the SWCNTs and their affinity to the coated substrate 202 and MONs 203 can also be modified by chemical derivatization with one or more of organic functional groups of similar or different types.

CNT-MON Hybrid Film

In an aspect, a method of forming a multi-layered film includes providing a substrate; providing a first suspension of carbon nanotubes (CNTs) in a first solvent; providing a second suspension of metal oxide nanoparticles (MONs) in a second solvent; applying the carbon nanotubes to the substrate from the first solvent; applying the metal oxide nanoparticles (MONs) from the second solvent, wherein, a plurality of the metal oxide nanoparticles are distributed throughout the carbon nanotubes to form an interconnected network repeating applying of the carbon nanotubes from the first solvent and applying the metal oxide nanoparticles (MONs) from the second solvent to form a hybrid film; and applying a distinct layer of a transparent conductive oxide (TCO) coating on the hybrid film.

In another aspect, a method of forming a multi-layered film includes providing a substrate; applying a layer of a transparent conductive oxide (TCO) coating through sputter deposition on the substrate; providing a first suspension of carbon nanotubes (CNTs) in a first solvent; providing a second suspension of metal oxide nanoparticles (MONs) in a second solvent; applying the carbon nanotubes to the layer of transparent conductive oxide (TCO) from the first solvent to form an interconnected network of carbon nanotubes; applying the metal oxide nanoparticles (MONs) from the second solvent, wherein, a plurality of the metal oxide nanoparticles are distributed in the interconnected network of carbon nanotubes forming an electrical contact with the carbon nanotubes; and repeating applying of the carbon nanotubes from the first solvent and applying the metal oxide nanoparticles (MONs) from the second solvent to form a hybrid film.

The CNT-MON hybrid films can be applied to a substrate from suspension using any suitable solvent. The CNT-MON hybrid films can be formed by an alternating deposition of CNT and MONs from their respective dispersions. In certain embodiments, the CNT dispersion having from about 0.005 wt % to 1 wt % CNT in a suitable solvent can be utilized. In certain embodiments, MONs dispersions having about 0.005 wt % up to 5 wt % MON in a suitable solvent can be utilized. As it would be readily apparent to one of ordinary skill in the art, a suitable dispersion/solution concentration may be utilized.

In some embodiments, alternate layer-by-layer deposition is used for depositing oppositely charged MONs and CNTs. Alternate, layer-by-layer assembly of oppositely charged, MONs and CNTs can be accomplished by many methods. Such process for alternate deposition of MONs and CNTs include, but are not limited to, spraying, reel to reel coating, dip coating, spin coating, roll coating etc.

The number of depositions alternating between the CNT and MONs can be controlled as desired. For example, the internal proportion of CNT:MON may range from about 1:99 to 99:1 by weight. When low amounts of CNTs are present, the film may lose some of the flexibility and mechanical strength that are provided by the carbon nanotubes. When the amount of MONs in the hybrid layer is low, the conductivity enhancement of the material is altered. Therefore, the appropriate balance of materials is selected to provide the desired balance of mechanical and electrical properties in the layer.

The number of layers and the density of each layer may be selected to obtain a target surface coverage. In one or more embodiments, the relative surface coverage of the CNTs and the MONs can range from about 1:99 to 99:1, and in some embodiments the surface coverage may be about 50:50

Additional binder materials can be utilized to assemble the desired CNT-MON structures. A variety of methods as described in U.S. Patent Application published as, US 2010/00047522 A1, attributed to Sivarajan or U.S. Pat. No. 7,045,087 B2, awarded to Kotov, or a combination can be used to assemble a CNT-MON film. In general, a transparent substrate can be pretreated with a binder material, such as a polymer, oligomer, a small organic molecule, a large organic molecule or a polyelectrolyte carrying one particular charge (e.g., positively charged). After a rinse and dry cycle, the substrate having the binder can be immersed into a CNT solution where the CNTs may be charged oppositely to that of the binder material (e.g., negatively charged). After a rinse and dry cycle, the CNT coated substrate can then be immersed in the binder material again followed by another rinse and dry cycle. Thereafter, the coated substrate can be immersed in a MON solution, where the MONs may be charged oppositely to that of the binder material (e.g., negatively charged, followed by a rinse and dry cycle. These steps can be repeated in a cyclic process as desired and as described in U.S. Patent Application published as US 2010/00047522 A2 or U.S. Pat. No. 7,045,087 B2, awarded to Kotov. Such an embodiment may be particularly useful when the CNTs and MONs both carry same electrical charge and the binder material carries an opposite charge.

In another embodiment, where CNT and MONs carry opposite charges in their respective solutions, the CNT-MON hybrid film can be formed without the use of any binder materials, as described in U.S. Patent Application published as US 2010/00047522 A1. As shown therein, a transparent substrate can be immersed into a CNT solution, where the CNTs may be charged positively or negatively. After a rinse and dry cycle, the CNT coated substrate can then be immersed in MON solution, where the MONs are charged oppositely to that of the charge of the CNT in solution. After a rinse and dry cycle, these steps can be repeated in a cyclic process as desired and as described in U.S. Patent Application published as US 2010/0047522 A1.

In certain embodiments, the hybrid layer thus formed is distinguished from a hybrid layer formed by depositing from a single dispersion or alternate deposition of uncharged sols because:

(a) the conditions required for forming stable dispersions of MONs can be distinct from conditions required for forming stable dispersions of CNT (e.g., choice of solvent, pH, ionic strength, concentrations, etc.). The conditions required for each dispersion may be incompatible, leading to instant flocculation of one or the other species on standing; and (b) the conditions for the application of a coating of MON from a solution may be incompatible with the conditions required for application of a coating of CNT from a stable dispersions (e.g., surface treatment, temperature, flow stability, etc.). The incompatible conditions may lead to flocculation of one or the other species during coating.

However, under certain conditions CNTs carrying a charge or no charge in the form of a dispersion can be alternately deposited with MON carrying a charge or no-charge from another dispersion using an alternate spray deposition method or alternate rod coat method or alternate slot coat method and other methods applicable.

Furthermore, without wishing to be bound by theory, the successive deposition steps described can be carried out under suitable conditions (e.g., at certain concentration of inks, deposition rate, temperature, viscosity, etc.) that advantageously form the morphology of the present invention rather than the multilayer films described in the conventional art. For instance, by using charged MONs, the MONs can be made to repel each other and the low solution concentrations utilized can ensure prevention of agglomeration of the MONs which results in the formation of a continuous layer as in the conventional art.

Even though the Layer-by-Layer (LBL) method of successive deposition of alternate dip coating is described in the present embodiment, various other coating approaches, such as spray painting, spin coating, knife coating, ink jet printing and the like techniques, can also be used.

In some embodiments the CNT-MON hybrid film 2000 can range from moderately thick to very thin. For example, the films can have a thickness between about 5 nm to about 100 nm. In certain embodiment, the films can have a thickness between about 20 nm to about 25 nm.

In some embodiments, the CNT-MON hybrid film 2000 have volume resistances in the range of $10^{-2}$ ohms-cm to about $10^{10}$ ohms-cm. In other embodiments, the hybrid film has a surface resistance in the range of less than about $10^{10}$ ohms/square. Preferably, the hybrid film has a surface resistance in the range of about $100\text{-}10^{10}$ ohms/square. In other embodiments, the hybrid film has a surface resistance in the range of less than about 2000 or less than about 1000 ohms/square.

In one or more embodiments, the CNT-MON hybrid film 2000 demonstrates excellent transparency and low haze. For example, the hybrid film has a total transmittance of at least about 60% or 70% (such as 77-95%) and a haze value of visible light of about 2.0% or less. In some embodiments, the hybrid films have a haze value of 0.5% or less. Total light transmittance refers to the percentage of energy in the electromagnetic spectrum with wavelengths less than 1×10$^{-2}$ cm that passes through the films, thus necessarily including wavelengths of visible light.

Sputter Coating of TCO Coating

Sputter coating of a TCO layer film can be achieved by a variety of methods. Wide ranging methods that include magnetron sputtering, radio frequency sputtering and DC sputtering among other variations. The deposition is effected by using a ceramic target material made of the TCO oxide or in the case of reactive sputtering the metal components are sputtered in the presence of oxidizing ambient such as oxygen gas in the sputter chamber. Sputter deposition of TCOs is a very mature industry today and the process is carried out on rigid and plastic substrates in static chambers or in a roll-to-roll process where the substrate is continuously moved. In the context of this specification the terms 'sputtering' or a 'sputter coated' film refers to any such method and a film made by one or more combination of those methods.

Properties of Multi-Layered Film

In some embodiments, the multi-layered films 200A and 200B have volume resistances in the range of 10$^{-2}$ ohms-cm to about 10$^{10}$ ohms-cm. In other embodiments, the film has a surface resistance in the range of less than about 10$^{10}$ ohms/square. In certain embodiments, the film has a surface resistance in the range of about 100-10$^{10}$ ohms/square. In other embodiments, the film has a surface resistance in the range of less than about 2000 or less than about 1000 ohms/square.

In one or more embodiments, the device including the multi-layered films 200A and 200B demonstrate excellent transparency and low haze. For example, the instant film has a total transmittance of at least about 60% or 70% (such as 77-95%) and a haze value of visible light of about 2.0% or less. In some embodiments, the instant films have a haze value of 0.5% or less. Total light transmittance refers to the percentage of energy in the electromagnetic spectrum with wavelengths less than 1×10$^{-2}$ cm that passes through the films, thus necessarily including wavelengths of visible light.

The multi-layered films 200A and 200B may have numerous applications ranging from printed electronics, OLED, heat mirrors in buildings, optical modulators, touch screens, RF antennas, RF tags, and numerous other commercial and military applications.

Several of the above noted applications require a robust structure that can endure flexing and mechanical stresses. Although, the conductivity and transparency properties are successfully met by state-of-the-art structures (as shown in FIG. 1A, FIG. 1B and FIG. 1C) these structures fail at providing stability of these properties when subjected to environmental factors and use. The ultimate deterioration of these properties may even result in premature untimely failure of the devices using these structures.

The multi-layered films 200A and 200B (as shown in FIG. 2A and FIG. 2B) are able to overcome this existing limitation of the state-of-the-art by offering films that are capable of enduring the rigors of the intended applications and yet maintain their properties at the desired levels of performance over a lengthened duration of life. In doing so, these structures also provide a more predictable and stable performance.

In some embodiments, the multi-layered films 200A and 200B show only a limited increase in sheet resistance after several flexes in a flex test, as described at another location in this specification. For example, in some embodiments, the increase in sheet resistance is no more than ten times its original value after 200 flexes. In some other embodiments, the increase in sheet resistance is no more than five times its original value after 200 flexes. In some other embodiments, the increase in sheet resistance is no more than 2-3 times its original value after 200 flexes. In some other embodiments, the increase in sheet resistance is less than ten times its original value after 400 flexes. In some other embodiments, the increase in sheet resistance is less than five times its original value after 400 flexes. In some other embodiments, the increase in sheet resistance is less than 3-4 times its original value after 400 flexes.

Example 1

Formation of Surfactant Aided Dispersions of CNTs and ITOs

As-produced single walled carbon nanotubes (AP-SWNT) made using Nano-C's patented combustion process, in accordance with U.S. Pat. No. 7,887,775] using an iron-based catalyst precursor for growing the SWCNT. Following the synthesis of the material, the quality and characteristics of the material were determined. The residual metal or metal oxides were determined by Thermogravimetric analysis (TGA) and Raman spectroscopy, to determine electronic defectivities of the tube. APSWNT are unfit for use as transparent conductive electrodes due to the significant presence of iron-based impurities from the catalyst precursor used in the synthesis, as well as unreacted amorphous carbon. formed during the synthesis of APSWNT. To eliminate these impurities, AP-SWCNT were purified in an acid wash process for the elimination of iron impurities A variety of purification steps are possible and they are described in detail in US 2010/00047522 A1.

A surfactant solution of 2 wt % sodium cholate was prepared with 200 mL of DI water and 4 g sodium cholate. 80 mg of SWNT was added to this mixture. The SWNT wet paste still had excess water, so a weight percent of SWNT in the mixture had to be estimated. Based on the isothermal TGA of the wet paste, 10 wt % is a fairly accurate estimate. This suspension was shear milled at 11,000 rpm for 1 hour. The suspension was allowed to cool and it returned to a fully dispersed state. The dispersion was sonicated (175 Watts) for 15 min and allowed to cool. In a last step, the solution was centrifuged at >40,000 g for 2 hours. After centrifugation, the top ⅔ of the mixture was collected and the rest were discarded.

A 0.5 wt % ITO mixture in aqueous 1.0 wt % poly (allylamine hydrochloride) (PAH) was prepared by mixing ITO (0.4 g) and PAH (0.8 g) thoroughly in DI Water (80 mL) and then sonicating with a microtip, ¼", at 550 W for 15 min. Finally, the solution was centrifuged at 5000 rpm for 30 minutes, and clear supernatant with very slight yellow tinge was collected. FIG. 3 shows UV-Vis-NIR absorption spectra of surfactant aided dispersion of SWCNT in water (solid line) and ITO nanoparticles suspended in water aided by poly-allylamine hydrochloride (PAH) coating (dotted line). Inset shows the photographs of the dispersions that were used for the work described in some examples. Dark liquid is CNT dispersion and the transparent dispersion is that of ITO nanoparticles.

Example 2

Formation of a Hybrid Film

Figure 4:
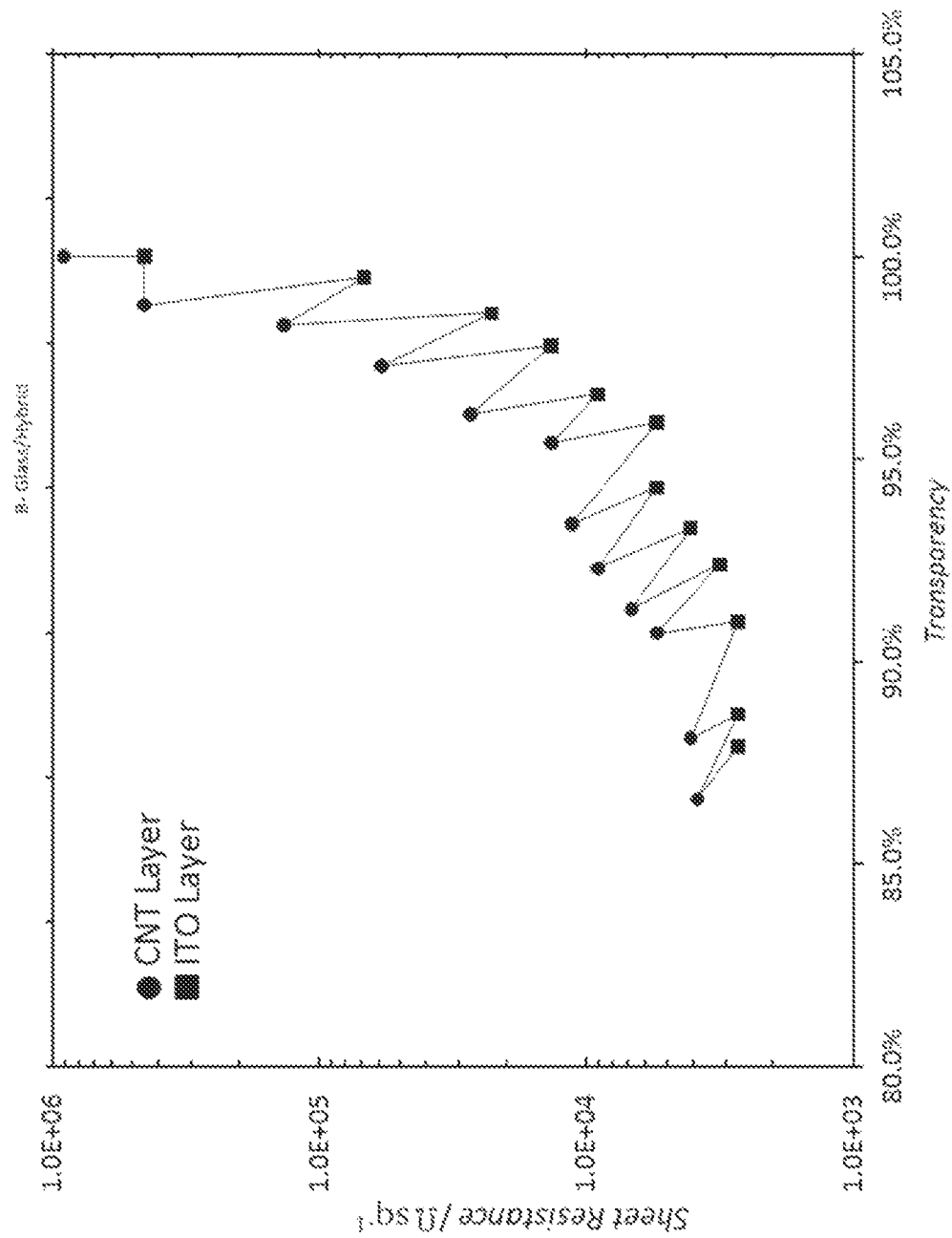
FIG. 4 shows the variation of transparency as a function of resistance with the alternate addition of carbon nanotubes and ITO nanoparticles to form a CNT-ITO hybrid.

Formation of a hybrid film by a layer-by-layer (LBL) process is described in this example. The dispersions described in Example 1 were used in this process. A Fischer Scientific premium microscope slide was vacuum-annealed for 30 min to remove any adsorbed organics on the glass. The ITO and CNT solutions (40 mL ea.) were then placed in 50 mL beakers and a 100 mL beaker was filled with DI for alternate washing. After the glass was cooled and cleaned, it was placed in the CNT solution and was left there for 2 min. Then, the glass was air dried for two minutes to allow the SWNT to deposit on the glass. The slide was then dipped in water and the back side was wiped clean to remove any SWNT that deposited on the back. The slide was then allowed to completely air dry so resistance and transparency measurement could be taken. Resistance was measured on a Hewlett-Packard 3478A Digital Multimeter using a Signatone four probe. The transmittance spectrum of the film was measured from 1100 nm-300 nm using a Shimadzu UV3101 spectrophotometer. The transmittance at 550 nm is recorded as the transparency value of the film. While the glass was drying, the PAH/ITO solution was sonicated to insure that the ITO particles were not bundling together and were evenly dispersed throughout the solution. The glass was then dipped in the PAH/ITO solution for 2 min. Then, it was allowed to dry for 4 minutes. This drying time was longer because after the SWNT dip, all of the liquid on the slide evaporated in the 2 min while the PAH/ITO solution did not. The slide was then water washed and backside wiped as in the previous step and the necessary measurements were taken. This process was repeated as necessary. When the dips no longer had as much of an effect on the resistance, the dip time was increased to 5 min to allow the particles more time to settle on the glass. When the resistance was no longer falling, the back was wiped with acetone to give a final clean. The formation of the CNT-ITO hybrid network was thus completed. This LBL process as described in was demonstrated with both glass and polyethylene terephthalate (PET) substrates. FIG. 3 shows the variation of transparency and resistance with the alternate addition of carbon nanotubes and ITO nanoparticles. FIG. 4 shows the variation of transparency as a function of resistance with the alternate addition of carbon nanotubes and ITO nanoparticles to form a CNT-ITO hybrid. The data clearly shows that as the number of layers of CNT and ITO deposition are increased the sheet resistance reduces. However, in conjunction with the reduction in resistance, the transparency also reduces. FIG. 5 shows the scanning electron micrographs at various magnifications of typical CNT-ITO hybrid film formed on glass.

Example 3

Figure 6:
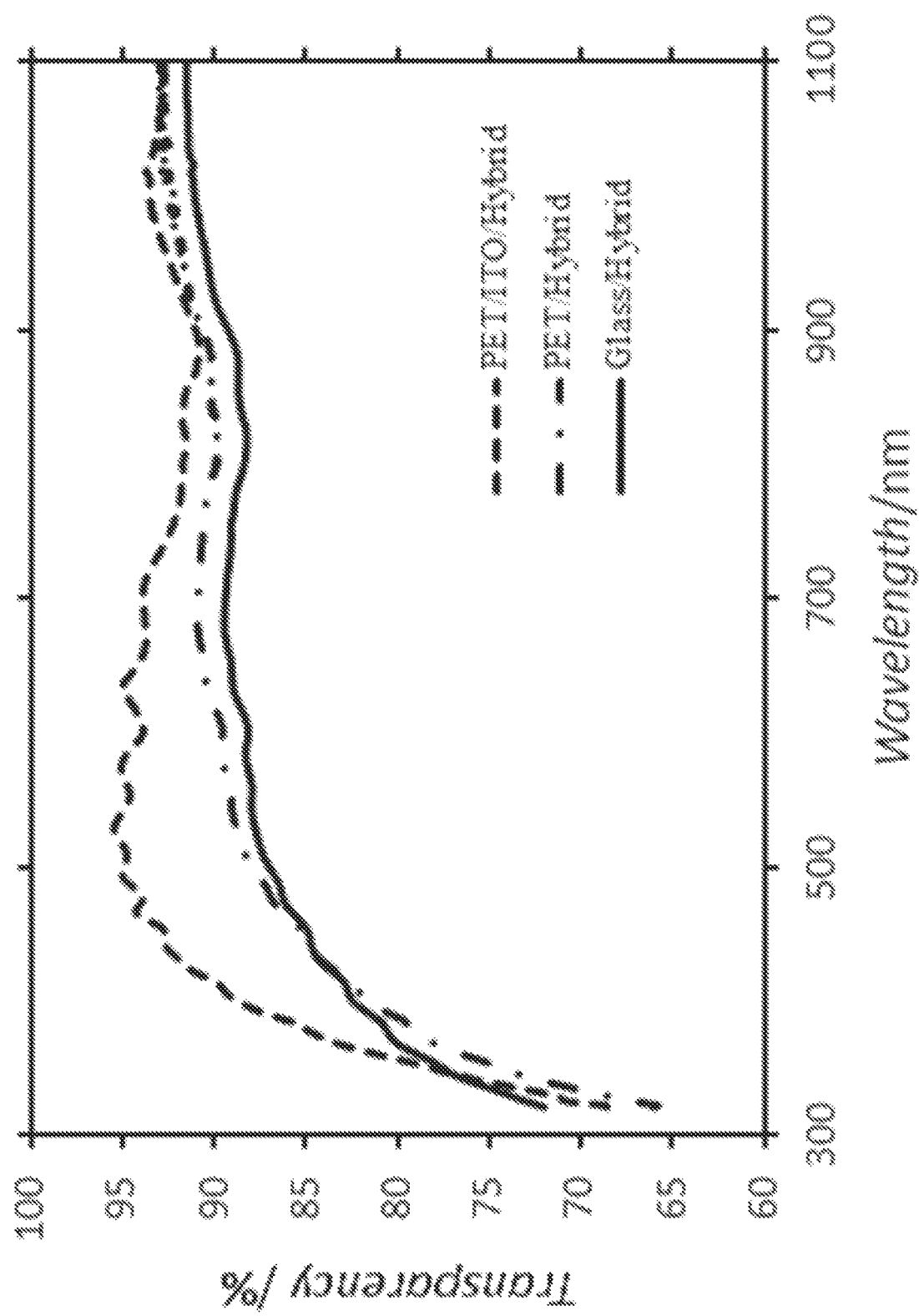
FIG. 6 shows transmittance spectra for a CNT-ITO hybrid film deposited on a glass substrate, a PET substrate and a PET-sputtered ITO substrate.

Enhancement of Mechanical, Electrical and Optical Properties Due to Presence of Hybrid Film and Sputtered ITO Several different variations of ITO/SWCNT films were made on polyester substrates (Polyethylene terephthalate; PET) by an LBL process as described in previous examples. Also, CNT-ITO hybrid films were deposited on top of commercially available sputtered ITO films on PET substrates, using the same procedure used for the control PET films. FIG. 6 shows transmittance spectra for a CNT-ITO hybrid film deposited on a glass substrate, a PET substrate and a PET-sputtered ITO substrate. Among the three samples, the CNT-ITO hybrid film deposited on a PET-sputtered ITO substrate has a superior transparency for wavelengths ranging from about 400 to about 900 nm.

Figure 7A:
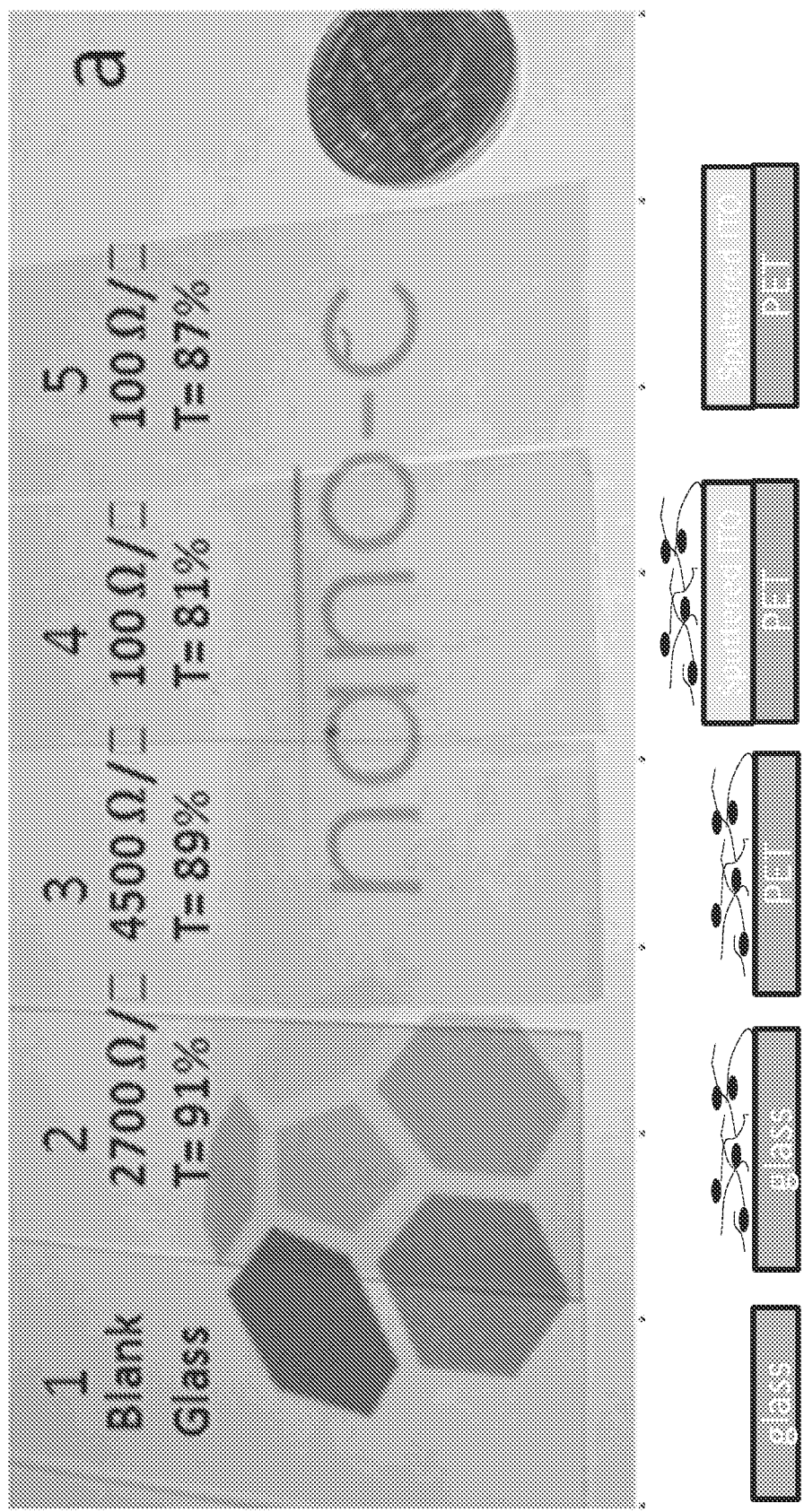
FIG. 7A shows the photographs of some of the various films produced along with their sheet resistance values and optical transmittance. In the order of the films shown, sample #1 is a blank glass substrate, sample #2 is a CNT-ITO nanohybrid film coated on the lower portion of the glass substrate, sample #3 is a CNT-ITO nanohybrid coated on a flexible PET, sample #4 is a hybrid CNT-ITO coating on a commercially purchased film of sputtered ITO on PET, and sample #5 is the bare uncoated sputtered ITO on PET.

FIG. 7A shows the photographs of some of the various films produced along with their sheet resistance values and optical transmittance. In the order of the films shown, sample #1 is a blank glass substrate placed for comparison. Sample #2 is a CNT-ITO nanohybrid film coated on the lower portion of the glass substrate. A similar film coated on a flexible PET substrate is shown as sample #3. Sample #4 is a hybrid CNT-ITO coating made on a commercially purchased film of sputtered ITO on PET. Sample #5 is the bare uncoated sputtered ITO on PET shown for comparison.

Figure 7B:
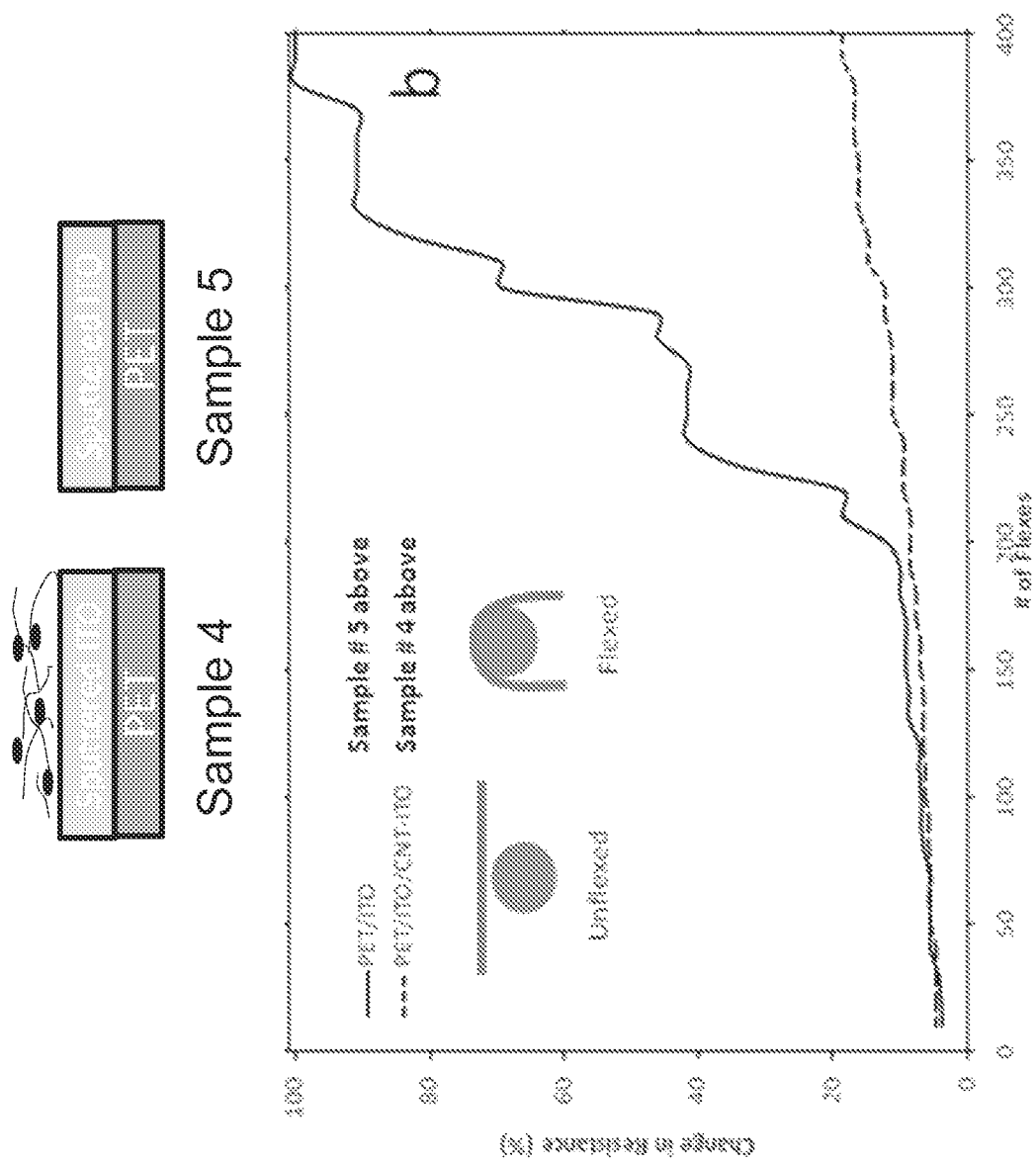
FIG. 7B shows the percentage change in sheet resistance values as a function of flexing of sample #4 (a hybrid CNT-ITO coating on a commercially purchased film of sputtered ITO on PET), and sample #5 (the bare uncoated sputtered ITO on PET) shown in FIG. 7A.

The mechanical properties of samples #4 and #5 were tested by a flexing test. Typically the coated section of the film was evenly placed over a 'A"' diameter stainless steel rod as shown as inset in FIG. 7B. Four probe electrical resistivity measurements were made after every 10 flexes. The results are presented in FIG. 7B. The commercial sputtered ITO sample on PET coated with a CNT-ITO hybrid coating showed remarkable resistance to microcracking compared to the uncoated sputtered ITO on PET control as evidenced from the change is sheet resistance after around 200 flexes in the uncoated sputtered ITO on PET sample (see solid line in FIG. 7B). The sample coated with CNT-ITO hybrid coating in contrast shows significantly more stable sheet resistance values (see dotted line in FIG. 7B).

Example 4

Figure 8:
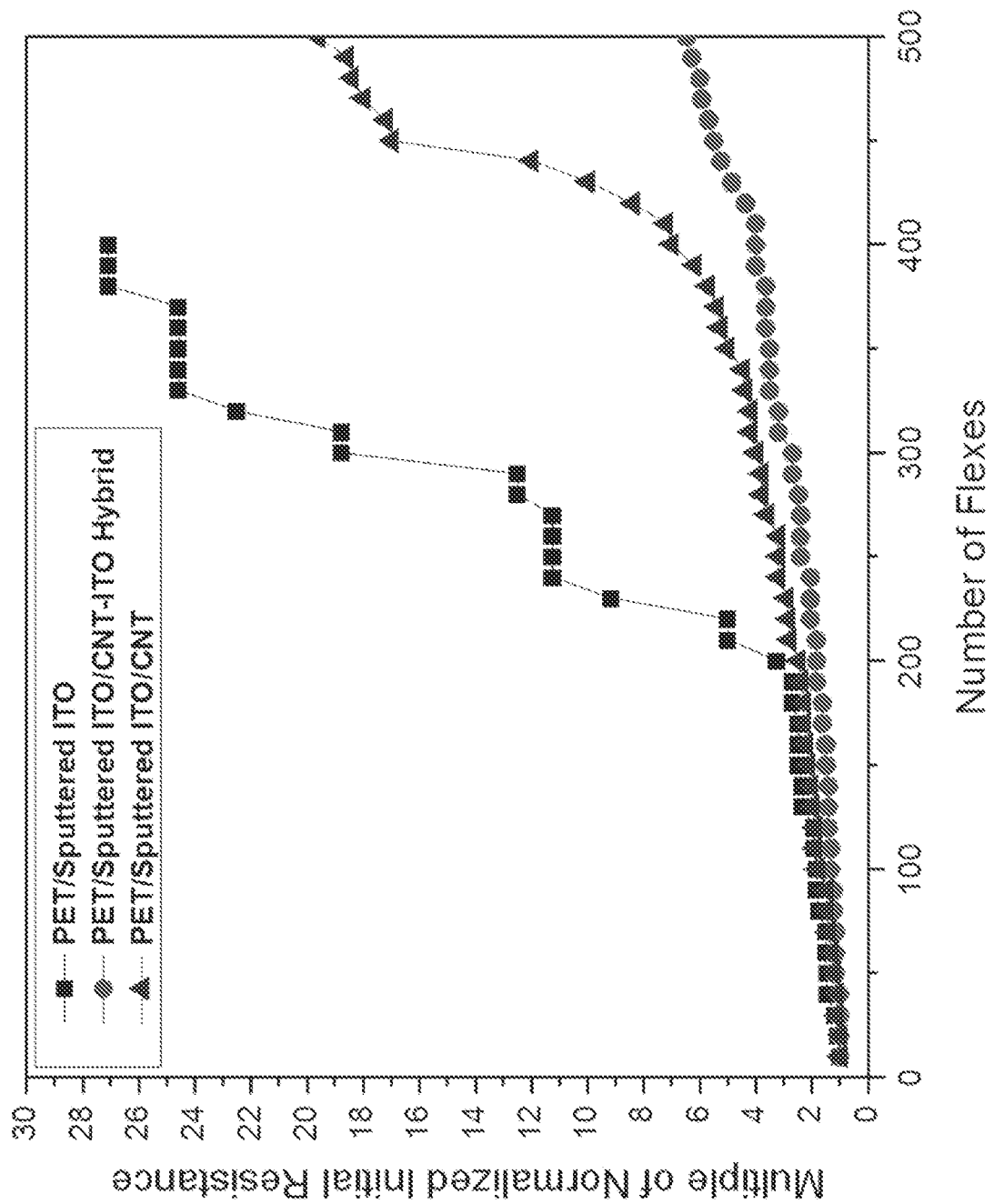
FIG. 8 shows the degradation in the sheet resistance through a plot of the multiple of the initial sheet resistance value as function of number of flexes for (i) SWCNT-ITO hybrid coated on top of commercial sputtered ITO on PET film (●), (ii) SWCNT coated on top of commercial sputtered ITO on PET film (▲) and (iii) a control of the commercial sputtered ITO on PET as function of flexing (■)

Improvement in Mechanical and Electrical Robustness of Sputtered ITO Coated PET With CNT-ITO Hybrid Film Samples correspond to (i) SWCNT-ITO hybrid coated on top of commercial sputtered ITO on PET film (see FIG. 2B) and (ii) SWCNT coated on top of commercial sputtered ITO on PET film (see FIG. 1B) were prepared using the process described above. A control of the commercial sputtered ITO on PET (see FIG. 1A), used as the substrate in the two structures, was also included in the testing. The endurance of the films under mechanical stress was tested by flexing each film 500 times. After every 10 flexes, the sheet resistance was measured and plotted as shown in FIG. 8. The line represented with circles (●) corresponds to sample with SWCNT-ITO hybrid film coated on top of commercial sputtered ITO on PET film (see FIG. 2B) and the line with triangles (▲)corresponds to the sample with only SWCNT coated on top of commercial sputtered ITO on PET film (see FIG. 1B). The commercial sputtered ITO on PET (see FIG. 1A), represented by the line with blocks (■), on its own showed a very low sheet resistance at the beginning (100 ohms/square). However, after about 200 flexes, the resistance began to increase rapidly. Both the SWCNT-ITO hybrid coated and SWCNT coated sputtered ITO on PET film showed significant improvement in the resistance to mechanical flexing as compared with the stand alone sputtered ITO on PET film as seen in FIG. 8.

However, upon elongating the test beyond 400 flexes, the superiority of the SWCNT-ITO hybrid film over the SWCNT film as a layer to protect the sputtered ITO on PET was observed. FIG. 8 illustrates this through the increase in sheet resistance observed for the SWCNT film on sputtered ITO on PET sample after 400 flexes. Although there is slight increase in the resistance observed in the SWCNT-ITO hybrid film coated on sputtered ITO on PET film samples, the increase is significantly less as compared with the only SWCNT film on sputtered ITO on PET film.

Example 5

Surfactant Free Dispersions of CNTs for CNT-ITO Hybrid Films

In yet another embodiment, surfactant free dispersions of carbon nanotubes can be used to form a CNT-ITO hybrid film as a specific acid purification step mostly leaves a net negative charge on the dispersed SWCNT to enable an LBL process. Many variations of the synthesis of surfactant free inks were described in the U.S. Patent Application published as US2011/0048277 A1, attributed to Sivarajan et al. The example outlined below describes the synthesis of a surfactant free ink used in the fabrication of CNT-ITO hybrid film described in Example 7 below.

In a special purification process 1 g of as produced combustion SWCNTs were mixed with 265 mL de-ionized (DI) water and 35 mL acetic acid in a 500 mL round-bottomed flask. The solution was stirred slowly for 18 hours, attached to an air-cooled condenser. The solution was then vacuum filtered through Whatman 50 filter paper and washed with DI water until pH was neutral. The wet CNT paste was collected and placed back into the round-bottomed flask with 250 mL DI water and 100 mL nitric acid. With a reflux condenser attached, the solution was refluxed and stirred for 3 hours. After it cooled to room temperature, the solution was vacuum filtered through Whatman 50 filter paper. The material was collected and stored in a glass jar as a stage 1 wet paste In an optional step, 0.71 g of the said paste was sonicated in 100 mL DI water for 15 minutes, and then added to 100 mL of lightly boiling 15% hydrogen peroxide. The solution was then stirred at low heat for three hours. Heat was turned off and the solution stirred until room temperature. Solution was then vacuum-filtered through Whatman 50 filter paper and washed with DI water until pH was neutral. The resulting CNTs were collected as stage 2 wet paste.

The use of acetic acid described in the purification process above can be replaced by hydrochloric acid or nitric acid or a combination of the above.

Example 6

Formulation of CNT Ink 0.5 g of CNT stage 2 paste prepared as described in Example 7 was added to 80 mL DI water and 20 mL ammonium hydroxide. The solution was sonicated for 30 minutes. The solution was then vacuum filtered through Whatman 50 filter paper with gentle agitation. When about 50 mL was left in the funnel, 90 mL of DI water and 10 mL of ammonium hydroxide were added, and the solution was filtered until about 50 mL were left again. The remaining solution was transferred via pipette to an Erlenmeyer flask and then sonicated for 15 minutes. It was then vacuum-filtered through a 300 nm filter paper with gentle agitation until filtration became exceedingly slow. The remaining solution was transferred to a flask and the filter paper was rinsed into the flask as well. 450 mL DI water and 0.585 g of 1,2,4 triazole (Tz) was added to the flask for a 0.1 wt % Tz solution. The solution was sonicated for one hour. Then it was centrifuged at 2,500 RPM for one hour, the precipitate was discarded, and the supernatant was filtered through a fine steel mesh. The supernatant was collected and sonicated for one hour. Then it was centrifuged at 10,000 RPM for one hour and the precipitate was discarded. The supernatant was filtered again through fine steel mesh and stored in a glass bottle as finished ink.

Example 7

Formulation of ITO Solution in Water

In yet another modification, a stable dispersion of indium tin oxide nanoparticles in water (ITO) was made. 80.0 mL of DI water was added to 0.401 g ITO and 0.801 g poly-allyl ammonium (PAA). The solution was stirred with no heat and then sonicated for 30 minutes. Next, the solution was centrifuged at 5,000 RPM for 30 minutes. The supernatant was collected and stored as the final ITO solution.

Example 8

Spray Deposited CNT-ITO Hybrid Film for Mechanical Reinforcement

The CNT-ITO hybrid films were deposited on (2"×3") commercially available polyethylene terephthalate (PET) coated with an index match coating (IM). The hybrid films were deposited by an alternate spraying process of the CNT and ITO inks using an air-brush. The inks and solutions were ultrasonically dispersed for 10 min prior to spraying. The substrates were held in place on a hot plate by a vacuum plate. ITO-CNT layers were spray coated by air brush at a substrate temperature of 95-110° C. Subsequently, ITO was sputter-coated on top of the hybrid film using the services of a commercial facility. The resulting structure is similar to the structure shown in FIG. 2A, except the index match coating (IM) would be present between the substrate 202 and the hybrid film 2000. Control samples prepared where ITO was sputter-coated on top of the index matching coating on the PET substrate under identical conditions. This structure would be similar to the structure shown schematically in FIG. 1A, except the index match coating (IM) would be present between the substrate 102 and sputter coated ITO 101.

Figure 9:
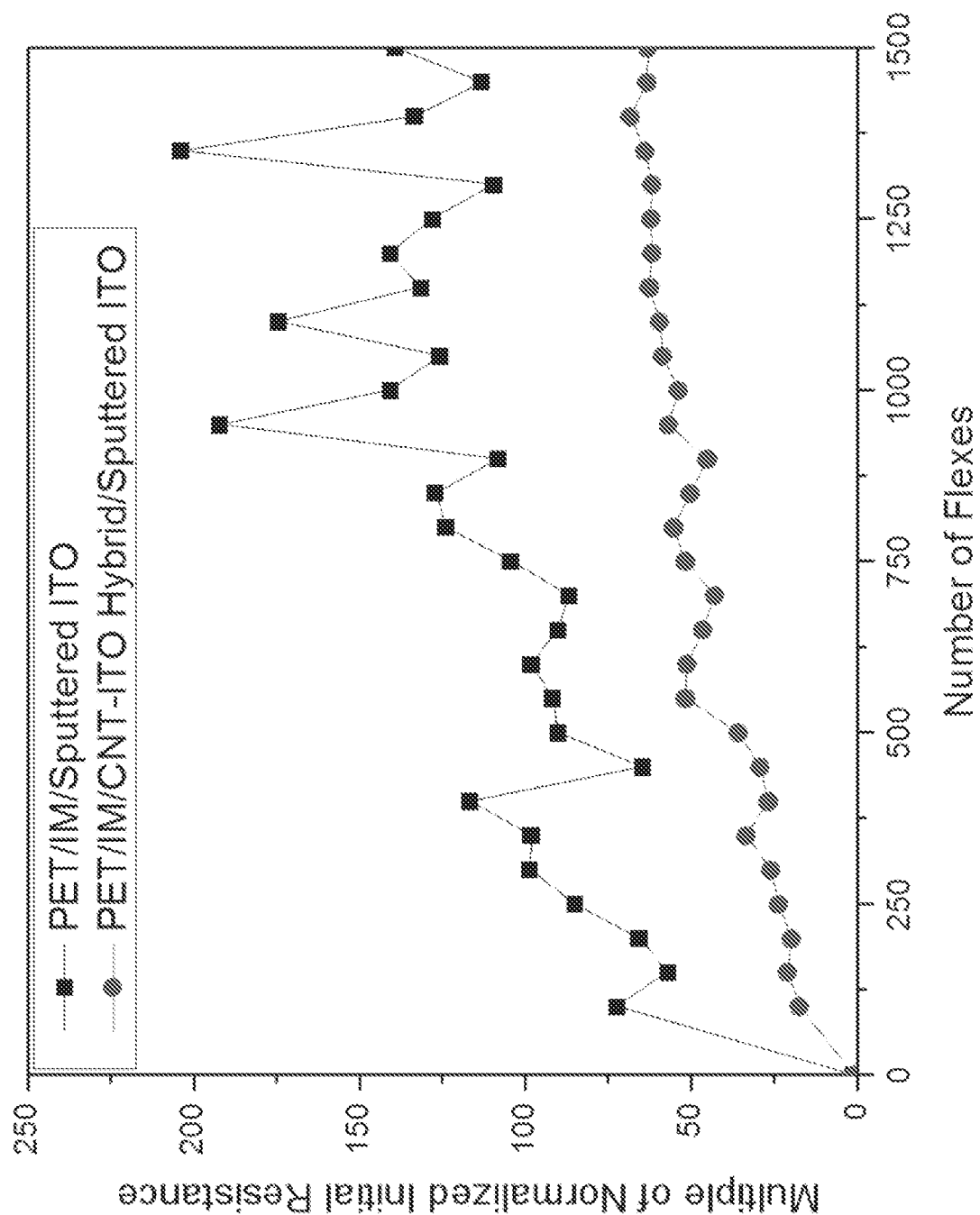
FIG. 9 shows the degradation of the electrical conductance of the reinforced and non-reinforced control films.

The two films fabricated, as described above, were gripped in either hand by the tester on both ends and wrapped around a 95 mm or 127 mm metal rod. The tester pulled the ends out to straighten the film, and then would return it to the wrapped position. This accounted for one "flex". Sheet resistance of the film was measured with a four-point probe at the center of the film in three different places. These three values were averaged together to get the most accurate value of the overall sheet resistance. FIG. 9 shows the degradation of the electrical conductance of the reinforced and non-reinforced control films through a plot of the multiple of initial resistance value as a function of the number of flexes. The film containing the hybrid film 2000 (circles) showed a much decreased rate of degradation over 1500 flexes compared to the control samples without a hybrid film (squares).

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

The invention claimed is:

1. A multi-layered film comprising:
   a substrate;

a layer of a hybrid film comprising:
  a network of carbon nanotubes and a plurality of metal oxide nanoparticles;
    wherein the plurality of metal oxide nanoparticles are randomly distributed in the network; and
  a layer of a transparent conductive oxide coating;
    wherein the transparent conductive oxide is sputter deposited to form a distinct layer in contact with the hybrid film;
    wherein sheet resistance of the multi-layered film increases by less than two times its original value after 200 flexes.

2. The multi-layered film of claim 1, wherein the transparent conductive oxide coating is disposed on the substrate and the transparent conductive oxide coating is disposed between the hybrid film and the substrate.

3. The multi-layered film of claim 1, wherein the transparent conductive oxide coating is disposed on the hybrid film and the hybrid film is disposed between the transparent conductive coating and the substrate.

4. The multi-layered film of claim 1, wherein the substrate is selected from a group consisting of metals, silicon, silicon oxide, plastics, organic polymers, inorganic polymers, glasses, crystals, and composite materials.

5. The multi-layered film of claim 1, wherein the substrate is transparent.

6. The multi-layered film of claim 1, wherein the metal oxide nanoparticles (MONs) are indium tin oxide.

7. The multi-layered film of claim 1, wherein the metal oxide nanoparticles are selected from a group consisting of $ZnO$, $SnO_2$, $ZnSnO_3$, $Cd_2SnO_4$, $In_2O_3$:Sn, $ZnO$:F, $Cd_2SnO_4$, $ZnO$:Al, $SnO_2$:F, $ZnO$:Ga, $ZnO$:B, $SnO_2$:Sb, $ZnO$:In and mixtures thereof.

8. The multi-layered film of claim 1, wherein the transparent conductive oxide coating is sputtered indium tin oxide.

9. The multi-layered film of claim 1, wherein the transparent conductive oxide coating is made of a material selected from a group consisting of $ZnO$, $SnO_2$, $ZnSnO_3$, $Cd_2SnO_4$, $In_2O_3$:Sn, $ZnO$:F, $Cd_2SnO_4$, $ZnO$:Al, $SnO_2$:F, $ZnO$:Ga, $ZnO$:B, $SnO_2$:Sb, $ZnO$:In and mixtures thereof.

10. The multi-layered film of claim 1, wherein the carbon nanotubes are chemically derivatized (functionalized).

11. The multi-layered film of claim 1, wherein the metal oxide nanoparticles are functionalized with a surface chemical species.

12. The multi-layered film of claim 1, wherein the optical transparency of the multi-layered film is greater than about 70%.

13. The multi-layered film of claim 1, wherein the electrical conductance of the multi-layered film is less than 2000 ohms/square.

14. The multi-layered film of claim 1, wherein the optical transparency of the multi-layered film is between 75-95% and the surface resistance of the hybrid film is about 10-2000 ohms/square.

15. The multi-layered film of claim 1, wherein the layer of the hybrid film and the layer of the transparent conductive oxide coating form a repeat unit and the repeat unit is repeatedly stacked over one another to form a multi-stacked structure.

* * * * *